(12) United States Patent
Barker

(10) Patent No.: US 7,975,649 B2
(45) Date of Patent: Jul. 12, 2011

(54) LIVESTOCK WATERER

(76) Inventor: Ruhl A. Barker, Monticello, IA (US)

( * ) Notice: Subject to any disclaimer, the term of this patent is extended or adjusted under 35 U.S.C. 154(b) by 365 days.

(21) Appl. No.: 12/233,101

(22) Filed: Sep. 18, 2008

(65) Prior Publication Data
US 2010/0064977 A1  Mar. 18, 2010

(51) Int. Cl.
A01K 7/06 (2006.01)
(52) U.S. Cl. ........................ 119/75; 119/61.55
(58) Field of Classification Search ............ 119/75, 119/74, 73, 78, 61.3, 61.53, 61.54, 61.55
See application file for complete search history.

(56) References Cited

U.S. PATENT DOCUMENTS

| 968,613 | A | * | 8/1910 | Ostrand | 119/72 |
|---|---|---|---|---|---|
| 1,569,738 | A | | 1/1926 | Forshee | |
| 1,574,756 | A | | 3/1926 | Peterson | |
| 1,839,595 | A | | 1/1932 | Ritchie | |
| 3,745,977 | A | * | 7/1973 | Martin | 119/73 |
| 3,943,889 | A | | 3/1976 | Sparber | |
| 4,138,967 | A | | 2/1979 | Tamborrino | |
| 4,286,546 | A | * | 9/1981 | Moore | 119/61.54 |
| 4,309,962 | A | | 1/1982 | Boozer | |
| 4,320,720 | A | | 3/1982 | Streed | |
| 4,433,642 | A | | 2/1984 | Leroy | |
| 4,559,905 | A | | 12/1985 | Ahrens | |
| 4,633,815 | A | | 1/1987 | Peterson et al. | |
| 4,646,687 | A | * | 3/1987 | Peterson et al. | 119/73 |
| 4,704,991 | A | | 11/1987 | Moore | |
| 4,708,091 | A | * | 11/1987 | Schafer | 119/73 |
| 4,739,727 | A | | 4/1988 | Boyer | |
| 4,856,459 | A | * | 8/1989 | Wiseman et al. | 119/73 |
| 4,883,022 | A | | 11/1989 | Barker | |
| 4,922,858 | A | * | 5/1990 | Ahrens | 119/73 |
| 5,174,245 | A | * | 12/1992 | Bishop | 119/73 |
| 5,738,037 | A | * | 4/1998 | Mahan | 119/72 |
| 5,791,287 | A | * | 8/1998 | Gruber | 119/74 |
| 5,887,544 | A | * | 3/1999 | Popelier | 119/61.54 |
| 7,600,486 | B2 | * | 10/2009 | Ellis | 119/61.5 |

FOREIGN PATENT DOCUMENTS

SU 640718 1/1979
* cited by examiner

Primary Examiner — Yvonne R. Abbott
(74) Attorney, Agent, or Firm — Allan L. Harms; Shuttleworth & Ingersoll, PLC

(57) ABSTRACT

A livestock waterer for use in frigid climates includes a lid which floats on the surface of the water in each basin of the waterer. The lid is hollow with a convex upper surface and with baffle walls depending from the underside of the lid. The baffle walls interrupt wave action on the surface of the water created by depression of the lid into the water when an animal presses down on the lid to gain access to the water. The floor of each basin is provided with an integrally formed mounting post to support a heater within the basin. The baffles walls prevent exhaustion of water within the basin thereby preserving submersion of the heater at all times.

18 Claims, 6 Drawing Sheets

LIVESTOCK WATERER

BACKGROUND OF THE INVENTION

The present invention relates to livestock watering devices and in particular to those devices which are equipped with heating devices.

Previous generations of livestock waterers consisted of open tubs in barnyards or pens. There livestock could access the water as needed. Improvements were then made to the cattle waterers which allowed the tubs to be filled automatically. Although the automatic fillers solved a number of problems with the waterers, problems relating to freezing persisted. Specifically, in sub-freezing climates, the water in the waterer is susceptible to freezing. In order to abate this problem, farmers began to use heaters to warm the water to above freezing. Although heaters aided in keeping most of the water in a liquid state, freezing still occurred at the air-water interface. Additionally, the costs of heating the waterers became more expensive. Improvements to better insulate the waterers led to insulation material utilized in the outer shell of the waterer and inventions directed at insulating the upper surface of the water itself. U.S. Pat. No. 4,646,687 discloses a waterer with a circular cover or lid which floats upon the water's surface. The lid could be manipulated by the animal in such a way to allow access to the water beneath. Other patents sized the lid to avoid its freezing to the surrounding opening. U.S. Pat. No. 4,883,022 implemented guide rails anchoring the cover to the waterer while still allowing the animals access to the water below. The guide rails assisted in preventing the animals from being able to physically remove the lids from the waterer.

With conventional lids, movement of the lids by animals seeking to drink creates turbulence and splashing of water from the waterer. This wastes water and also creates a muddy ground surface around the waterer or leads to ice build up on the outside of the waterer. The shape of previous lids made them prone to generating wave action within the waterer. Wave action causes water to be lost which in turn add extra costs in the replacing of the water as well as heating of the replacement water.

One other shortcoming is the placement of the heater within the waterer. Traditionally, the heater is placed in a protected central location away from the basins accessible by the animals so that the animals will not damage the heating element. The heat created by the heating element must travel from the central location of the waterers to the basins and may be sufficiently dissipated before water in the basins is sufficiently warmed to prevent freezing in frigid weather conditions.

BRIEF SUMMARY OF THE INVENTION

An improved livestock waterer includes a base which provides one or more basins for containing water which may be accessed by an animal seeking water. The basins are separated by an enclosure which is an integral part of the base. The enclosure may house heater and water supply elements and may also include a central water container from which water may circulate to the basins through ports connecting the basins to the central water container.

Each of the basins is provided with a polymeric or other non-metal floating lid. Each lid is constructed as a hollow enclosure in which air is trapped. The upper surface of each lid is in the form of a dome or convex curve so that water will not remain standing on the upper surface. The underside of each lid includes a number of baffles which reduce wave action on the surface of the water below the lid as the lid is depressed or displaced by an animal seeking water below the lid. By reducing turbulence below the lid, less chance exists that water will splash from the basin during drinking activity, or when an animal experiments with the lid out of curiosity.

Heating elements may be placed within the water basins. Each heating element is supported on a post which is formed integrally with the base such that the post will stand upright upon the bottom of a water basin.

A primary object of the invention is to provide an improved livestock waterer which reduces the incidence of splashing from the waterer when an animal displaces the lid floating on the water made available to the animal.

Another object of the invention is to provide an animal waterer which is less susceptible to ice accumulation on the floating lids overlying the water within the waterer.

A further object of the invention is to provide an improved mounting structure for a heater element stationed within the water in the waterer.

Yet another object of the invention is to provide an animal waterer which always maintains water covering the heating elements.

These and other objects of the invention will be apparent from the detailed description which follows.

BRIEF DESCRIPTION OF THE SEVERAL VIEWS OF THE DRAWING(S)

DETAILED DESCRIPTION OF THE INVENTION

Figure 1:
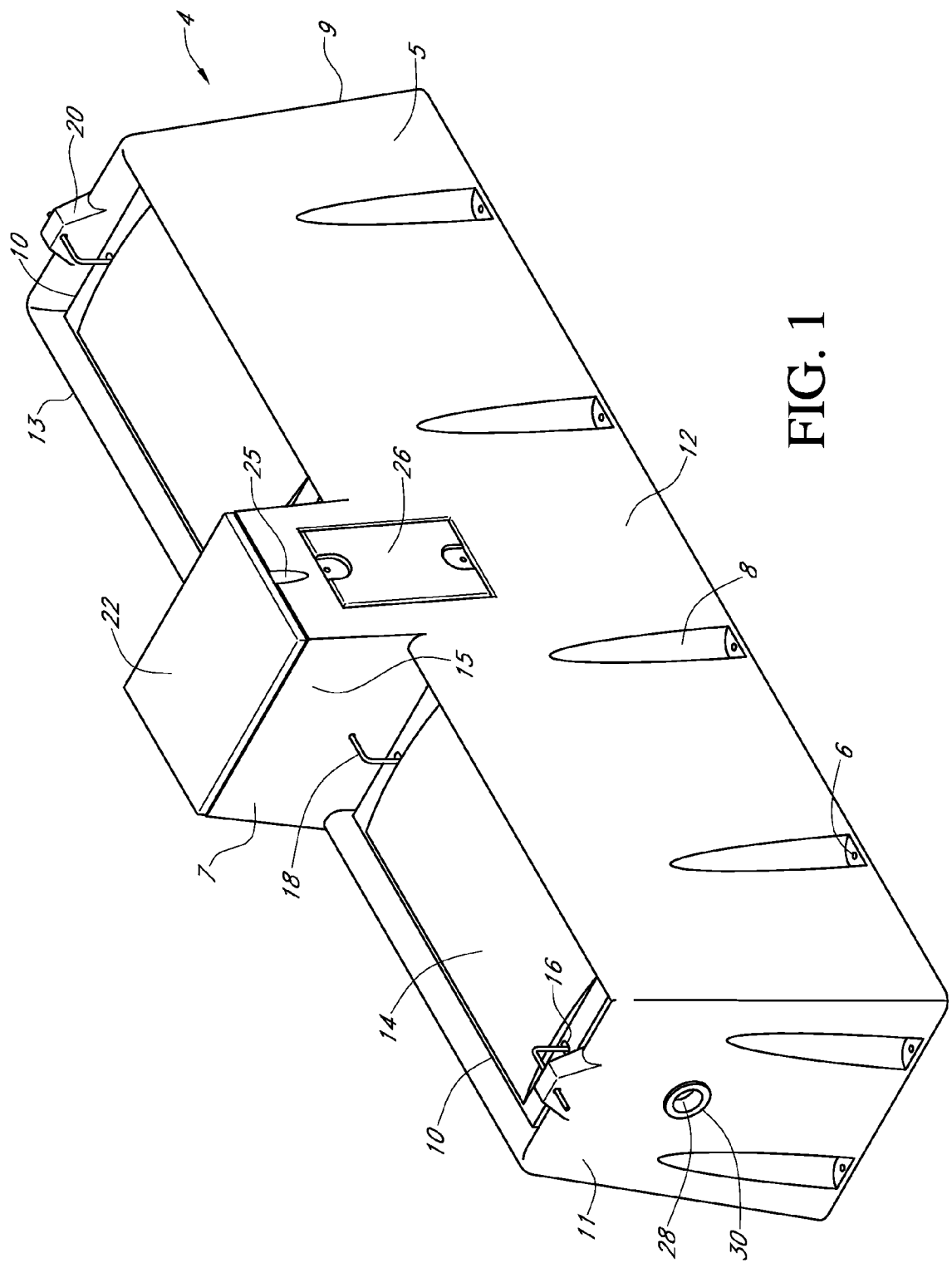
FIG. 1 is a perspective view of an embodiment of the waterer having elongate water basins separated by a central enclosure.

Referring now to the drawings, one embodiment of the livestock waterer 4 can be seen in perspective in FIG. 1 positioned to demonstrate the three dimensional shape of the structure. Mounting points 6 can be used to secure the invention to a surface such as a concrete platform with the use of a selected type of mounting hardware. Mounting recesses 8 allow easier access to the mounting points 6 and ease in the facility of accessing the chosen mounting hardware.

Livestock waterer 4 includes a housing 12 which comprises two basins 10 separated by an elevated enclosure 7. The housing 12 further comprises front and rear longitudinal sidewalls 5, 13 and opposing end walls 9, 11. Sidewalls 5, 13, end walls 9, 11 and elevated enclosure 7 are formed integrally of polymeric material. Lids 14 substantially cover the opening of basins 10. Lids 14 are buoyant, preferably hollow and are made from a polymeric material. Lids 14 preferably float on the surface of water contained within each basin 10. Pass through openings 16 in the lids 14 allow guides 18 to pass through the lids 14. Guides 18 each consist of elongate vertically disposed rods which extend into basin 10 and are fixed at the bottom of basin 10. Guides 18 are also retained in an upstanding orientation by their attachment to guide mounts 20 atop opposing end walls 9, 11 or by attachment to the sidewalls 15 of elevated enclosure 7. Guides 18 are spaced apart from basin sides a small distance. Preferably one guide 18 is located along each opposite side of the basins 10. A top access panel 22 on the top of the elevated enclosure 7 is removable to access equipment such as a float valve (not shown) within elevated enclosure 7. Recess 25 facilitates removal of the top access panel 22. Side access panel 26 is selectively removable from the livestock waterer 4 and provides access to the interior of the elevated enclosure 7. Plugs 28 are received in openings 30 in end walls 9, 11 to seal openings 30 which are in communication with the basins 10. The plugs 28 are selectively removable and once removed, allow water to drain from the basins 10.

Figure 2:
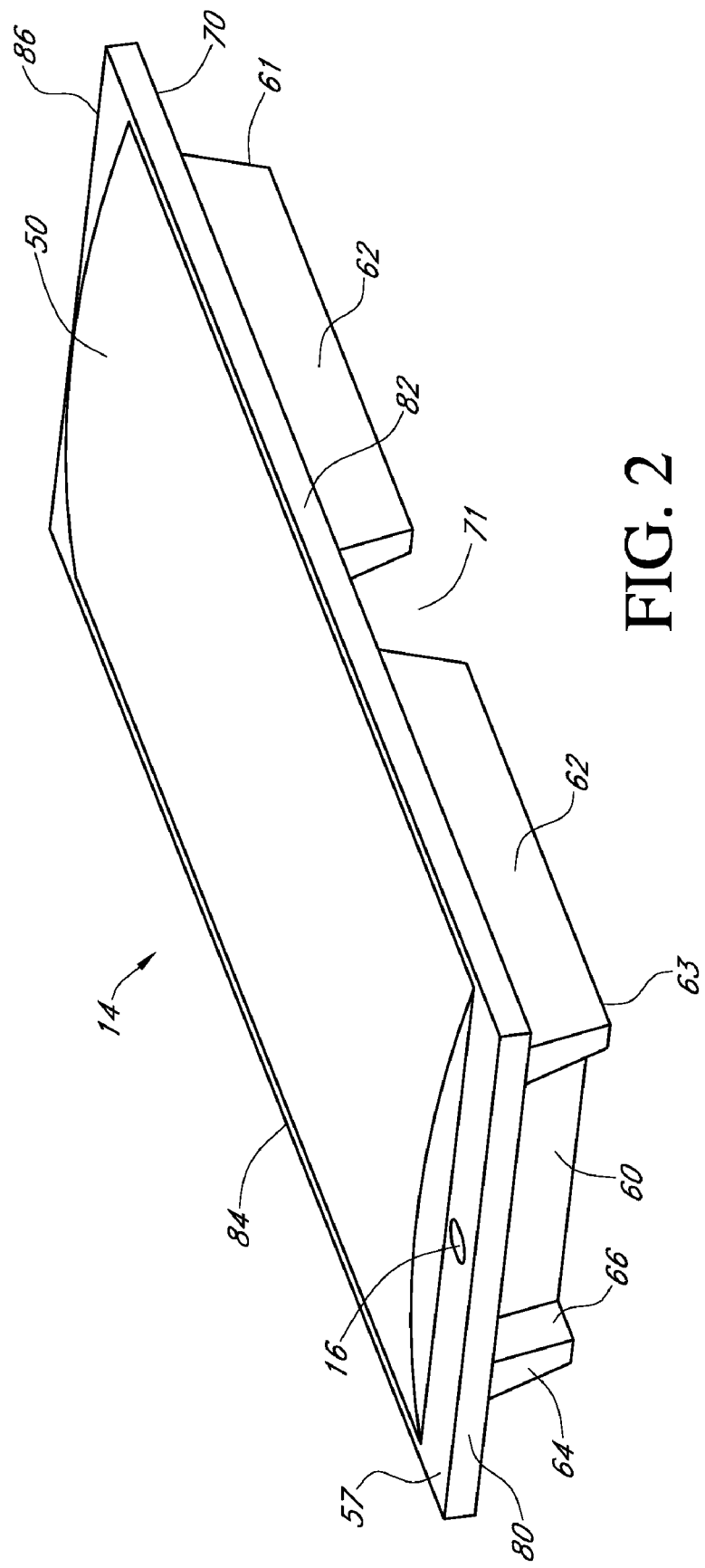
FIG. 2 is a top view perspective of the lid of the embodiment of FIG. 1.
Figure 3:
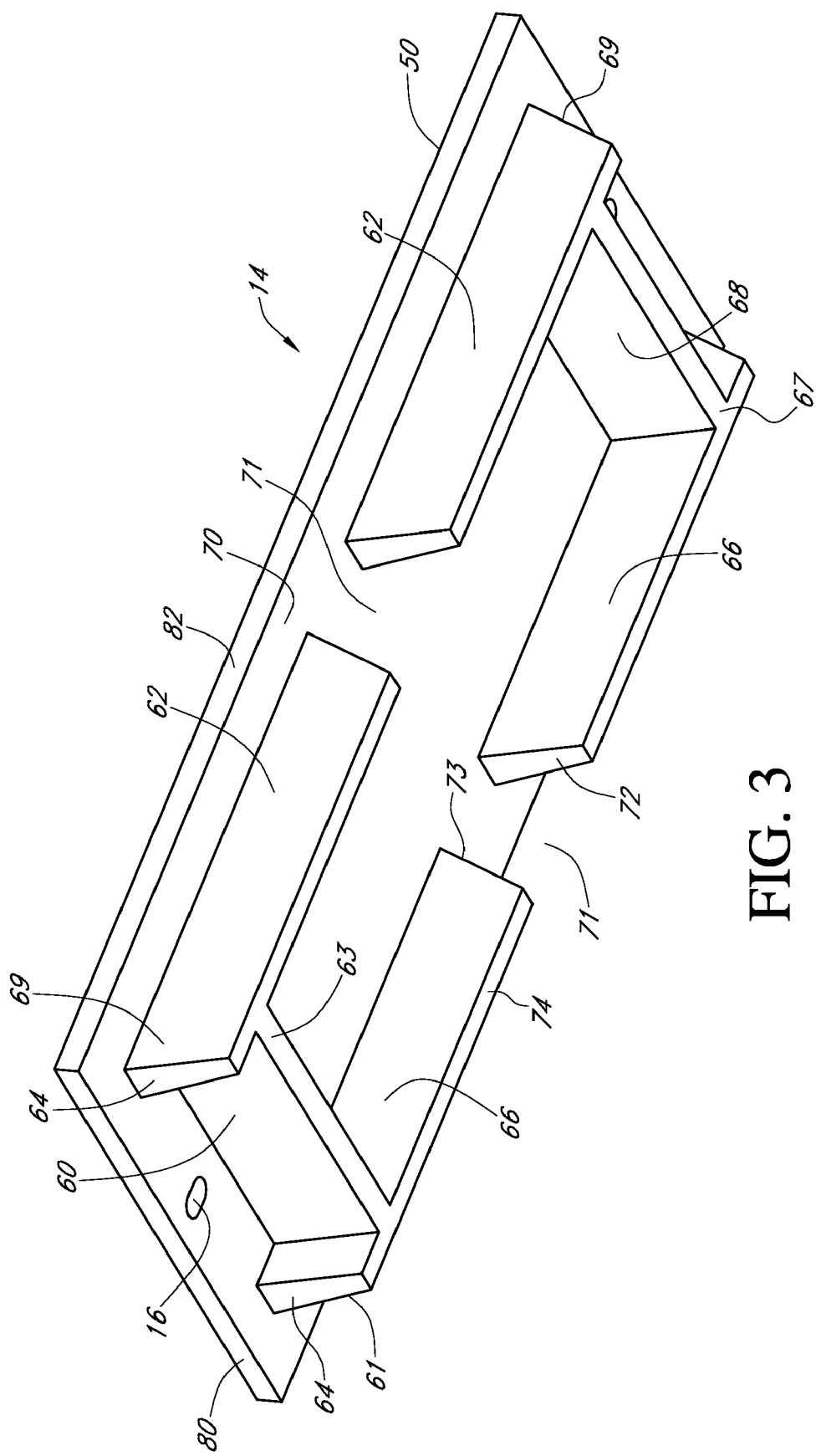
FIG. 3 is a bottom view perspective of the lid of the embodiment of FIG. 1.

Details of the structure of each lid 14 may be seen in FIGS. 2 and 3. Each lid 14 includes an upper surface 50 and an underside 70. Upper surface 50 of each lid 14 is preferably convex in shape and upper surface 50 may be formed as a segment of a cylinder or may otherwise be domed in shape. Peripheral regions 57 of upper surface 50 may be planar though they are not required to be so. Peripheral regions 57 of upper surface 50 are preferably kept minimal in area to provide little planar surface on which water may collect. Lid 14 is preferably hollow with upper surface 50 sealed at side edges 80, 82, 84 and 86 to underside 70 so that air is trapped within lid 14 and it is buoyant.

As seen specifically in FIG. 3, the underside 70 of lid 14 is substantially planar. A baffle system 61 depends from the underside 70. Baffle system 61 comprises transverse walls 60, 68 and longitudinal walls 62, 66, each of which are generally perpendicular to the underside 70 of lid 14. Bottom edges 74 of baffle system 61 may be parallel to underside 70 and may extend approximately one to five (preferably two to three) inches from underside 70 of lid 14. The baffle system 61 may be integral with the other structures of lid 14. Longitudinal walls 62, 66 of baffle system 61 extend substantially the length of underside 70 but are interrupted by gaps 71 therein. In the preferred embodiment transverse walls 60, 68 interconnect longitudinal walls 62, 66 at a substantial perpendicular near distal ends 64, 69 of longitudinal walls 62, 66. Distal ends 64, 69 of longitudinal walls 62, 66 extend past their intersections with transverse walls 60, 68 a short distance which, in the case of a lid 14 which is of a total length of approximately thirty-six inches, may be one to two inches. Distal ends 64, 69 may be inclined from bottom edge 74 at twenty to seventy degrees and preferably from thirty to sixty degrees. Proximal edges 72, 73 of longitudinal walls 62, 66 extend approximately ten to twelve inches past transverse walls 60, 68 in the case of a lid 14 of length in the range of thirty-six inches. Longitudinal walls 62, 66 are longitudinally aligned with proximal ends 72, 73 thereof spaced apart from one another to form gaps 71. Proximal ends 72, 73 may be inclined at ten to eighty degrees from perpendicular to underside 70 preferably at 30 to 60 degrees. Gaps 71 between proximal ends 72, 73 of longitudinal walls 62, 66 are critical in providing turbulence damping so that air is not trapped between longitudinal walls 62, 66 and transverse walls 60, 68 below lid 14. The gaps 71 separate baffle system 61 into first set of baffles 63 and a second set of baffles 67. The second set of baffles 67 mirrors the first set of baffles 63 in the preferred embodiment. The baffle system 61 interrupts and abates the wave motion of the water caused when an animal manipulates lid 14 to access the water. The baffle system 61 may be formed on underside 70 as an integral part of lid 14 and each wall 60, 62, 66 and 68 may be hollow.

Figure 4:
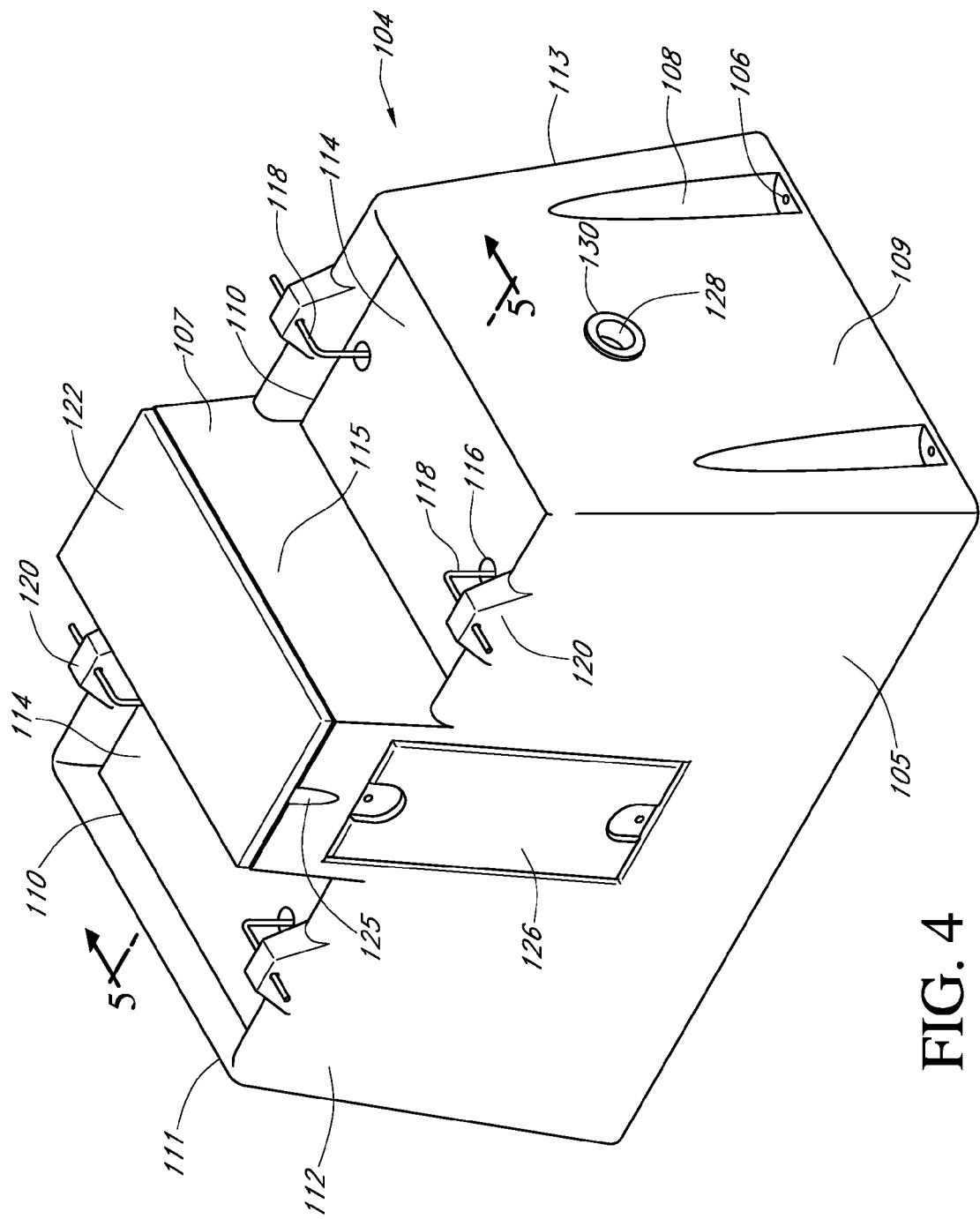
FIG. 4 is a three-dimensional front perspective of a second embodiment of the invention.
Figure 5:
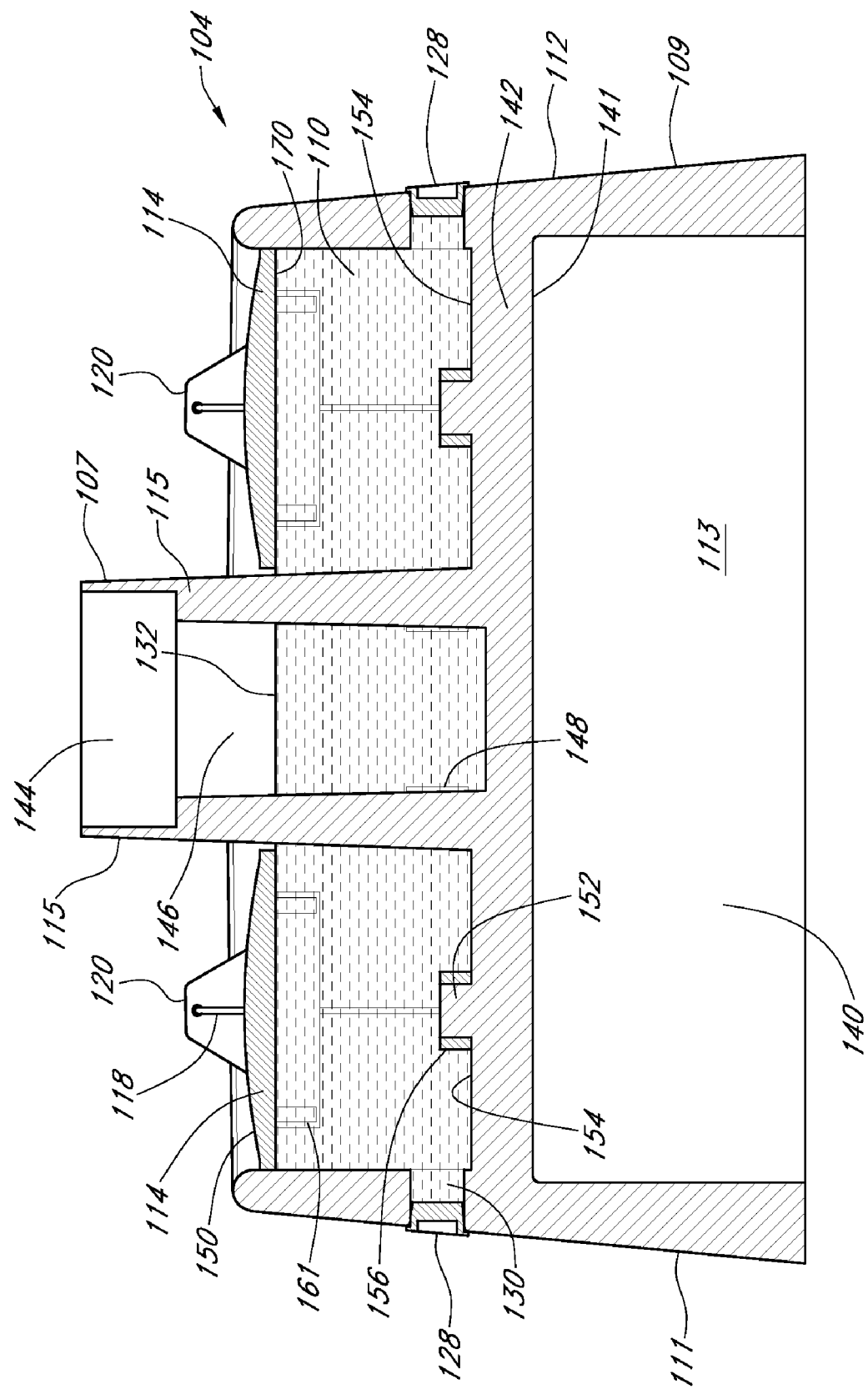
FIG. 5 is a cross-sectional view taken along line 5-5 of FIG. 4, shown with water in the waterer.

A second embodiment of the invention is seen in FIG. 4 and FIG. 5. Livestock waterer 104 shares many of the structures and characteristics of the embodiment detailed in FIGS. 1-3. Mounting recesses 108 allow access to mounting points 106 which can be fitted with hardware to anchor the livestock waterer 104 to a ground surface. Livestock waterer 104 contains basins 110 set in housing 112. The housing 112 further comprises front and rear longitudinal sidewalls 105, 113 and opposing end walls 109, 111. Recess 125 allows a top access panel 122 to be removed easier. The top access panel 122 and side access panel 126 are selectively removable and allow access to the interior of the elevated enclosure 107.

A lid 114 substantially covers each of basins 110. Openings 116 in lids 114 allow guides 118 to pass through lids 114. Guide mounts 120 extend from the sidewalls 105, 113 and secure the guides 118. Guides 118 are further secured by being anchored to bottom 141 of basins 110.

Now referring to FIG. 5, a cross-sectional view shows more detail of the second embodiment livestock waterer 104. Cavity 140 within the livestock waterer 104 extends to the bottom 141 of basin shelf 142. Housing 112 comprises end walls 109, 111 which cooperate with basin shelf 142 and longitudinal sidewalls 105 (seen in FIG. 4), 113 to define cavity 140. Sidewalls 115 of elevated enclosure 107, end walls 109, 111, longitudinal sidewalls 105, 113 and basin shelf 142 cooperate to define basins 110 which are elevated above a ground surface. Longitudinal sidewalls 105, 113, sidewalls 115 of elevated enclosure 107 and end walls 109, 111 can be seen to be an integral one-piece polymeric structure formed by molding. A water supply pipe (not shown) may traverse cavity 140 and pass through basin shelf 142 to enter central fill tub 146. Float compartment 144 adjoins central fill tub 146 and provides a location for a float valve (not shown) from which central fill tub 146 is filled. The water enters the basins 110 via ports 148 which connect basins 110 with central fill tub 146. Lids 114 are buoyant and are supported on water surface 132 within basins 110. Therefore, lids 114 rise with the addition of water to the basins 110. Lids 114 slide vertically on guides 118 as water is added to or removed from the basins 110 and as animals seeking water depress lids 114 to gain access to water below lids 114.

Once basins 110 are filled to a desired level with water, a float valve (not shown) located in elevated enclosure 107 closes to prevent further inflow of water from a water source. An animal gains access to the water by pushing lid 114 downward. As the animal exerts downward force, the lid 114 partially submerges and water rolls over upper surface 150. Once the animal ceases to exert downward force on lid 114, water rolls off convex lid 114 and the lid 114 returns to its floating position on top of water contained in basin 110.

Again referring to FIG. 5, basin floor 154 contains elements aiding in the heating of the water contained in basins 110. Post 152 extends from basin floor 154 and may be integrally formed with basin floor 154. In the preferred embodiment, post 152 is cylindrical. The shape and size of post 152 is selected such that heater 156 may attach to the periphery of post 152. The heater is positioned in the middle of basin floor 154 in such a way so it cannot be accessed by an animal drinking from the livestock waterer 104.

As water is removed from the livestock waterer by the animals or through evaporation, the lids 114 descend toward the basin floor 154. The baffle system 161 of lids 114 of livestock waterer 104 depend from underside 170 of lids 114 to a distance of at least the height of post 152. This minimal length assures water will always sufficiently cover the heater 156 and minimize overheating of heater 156.

Again referring to FIG. 4 and FIG. 5, the basin floor 154 may be sloped to provide enhanced emptying and cleaning of the livestock waterer 104. Once plugs 128 are removed from openings 130, water drains from basins 110. The top access panel 122 and side access panel 126 allow a person to more easily access a heating element or water supply within the housing 112.

Figure 6:
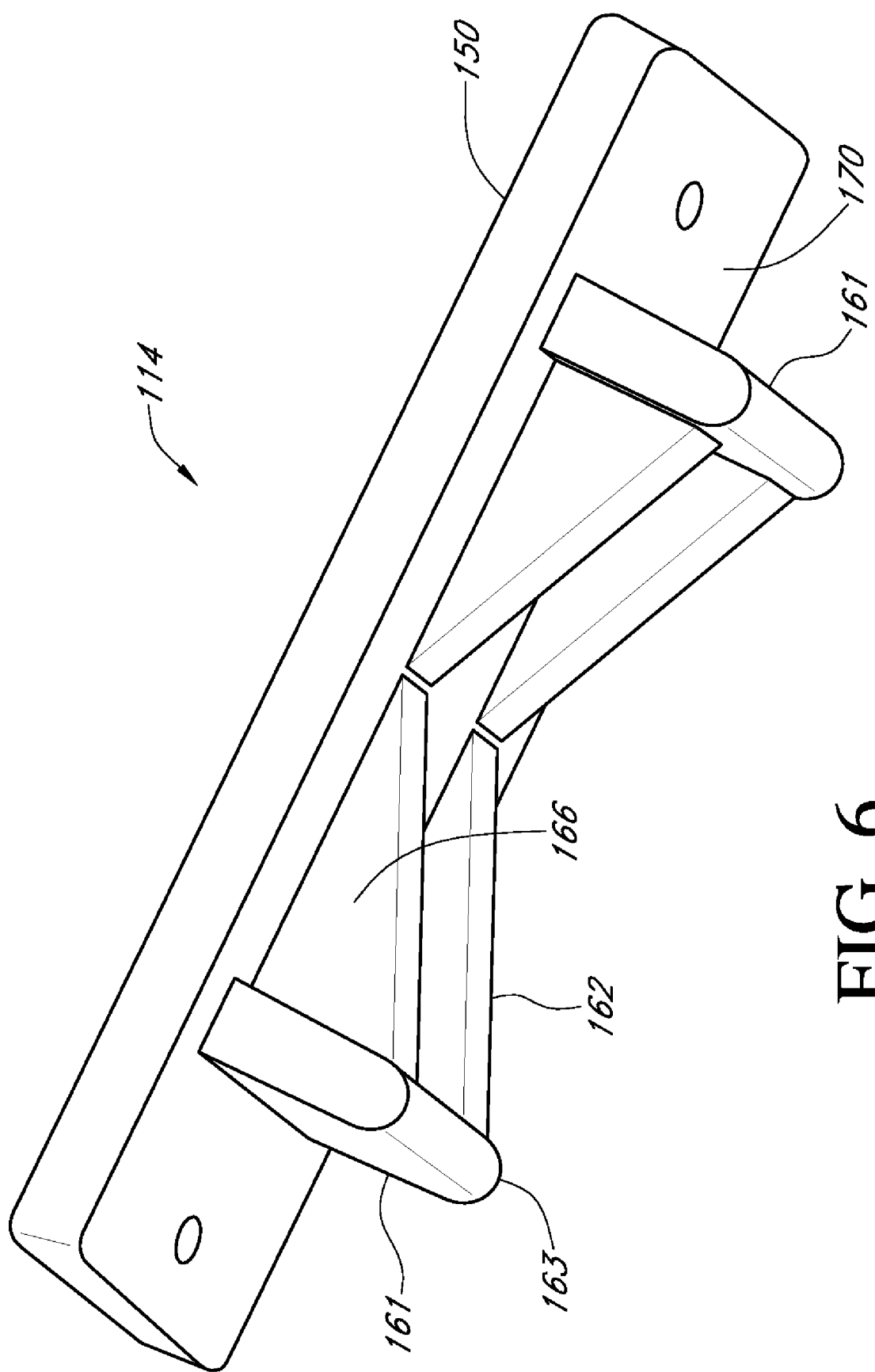
FIG. 6 is a bottom view perspective of the lid for each of the basins of the livestock waterer of FIG. 4.

FIG. 6 discloses a lid 114 for the embodiment of the livestock waterer 104 of FIG. 4. Lid 114 comprises an upper convex surface 150 and an underside 170 which is substantially planar. Baffle systems 161 depend from underside 170 and each comprises a transverse wall 163 joined perpendicularly to longitudinal walls 162 and 166 which are spaced apart. Each of longitudinal walls 162 and 166 inclines from its attachment to transverse wall 163 to the underside 170, leaving a small gap between baffle systems 161 approximately midway along underside 170. Walls 162, 163, 166 each preferably depends at a substantial perpendicular from underside 170.

In the foregoing description, the container has been described in connection with preferred embodiments, but it should be understood that the description does not intend to limit the container to the embodiments described. Rather, this description is intended to include such alternatives, modifications and equivalents as may be included in the sphere and scope of this invention, as more particularly set forth in the claims.

Having thus described the invention, I claim:

1. Apparatus for watering animals, the invention comprising
a housing supported upon a ground surface,
the housing comprising at least one basin for receiving water,
the housing supporting the at least one basin elevated above the ground surface,
the at least one basin having a top opening through which an animal may access water within the at least one basin,
a buoyant lid supported by water within the at least one basin,
the lid generally conforming to the top opening of the at least one basin,
the lid comprising at least one wall element depending from an underside thereof,
at least a first guide member mounted to the housing and disposed generally vertically,
the guide member extending into the at least one basin,
the lid slidable along the guide member,
whereby the lid may be forced downwardly by an animal seeking water in the at least one basin.

2. The animal waterer of claim 1 wherein
the lid having a top surface,
the top surface being convex.

3. The animal waterer of claim 1 wherein
the underside of the lid is substantially planar,
the at least one wall element depending generally perpendicularly from the underside of the lid.

4. The animal waterer of claim 1 wherein
the buoyant lid is a hollow polymeric shell.

5. The animal waterer of claim 4 wherein
the at least one wall element is integral with the polymeric shell,
the at least one wall element being hollow.

6. The animal waterer of claim 5 wherein
the guide member is an elongate vertically disposed rod,
the rod spaced apart from a side of the basin,
the lid including an opening therethrough through which the guide member is received.

7. The animal waterer of claim 1 wherein
a plurality of wall elements depend substantially perpendicularly from the underside of the lid,
at least one of the wall elements being longitudinally aligned with the lid,
at least a second of the wall elements being perpendicular to the at least one of the wall elements.

8. The animal waterer of claim 1 wherein
a multiplicity of wall elements depend substantially perpendicularly from the underside of the lid.

9. The animal waterer of claim 8 wherein
at least two of the wall elements longitudinally aligned and spaced apart defining a gap therebetween.

10. The animal waterer of claim 8 wherein
at least a third of the wall elements is joined perpendicularly to a one of the at least two longitudinally aligned wall elements.

11. The animal waterer of claim 1 wherein
the housing comprises two basins for containing water,
each of the basins having a buoyant lid floating upon water within the basin,
each of the lids comprising at least one wall element depending from the underside thereof,
a water reservoir disposed between the basins,
the water reservoir communicative with each of the basins,
whereby water may pass from the water reservoir to the basins.

12. The animal waterer of claim 1 wherein
the housing and the basins are integrally formed,
the water reservoir integral with the housing and the basins.

13. The animal waterer of claim 1 wherein
an upstanding post is integrally formed on a bottom of the at least one basin,
a heater element supported upon the upstanding post,
the heater element encircling the upstanding post,
whereby water in the at least one basin is heated by the heater element.

14. The animal waterer of claim 1 wherein
the lid is slidable along two guide members,
each guide member mounted to the housing and extending into the at least one basin,
the guide members disposed at opposing sides of the basin,
the lid having two openings therethrough,
each opening through the lid receiving one of the guide members.

15. The animal waterer of claim 1 wherein
the lid having a top surface,
the top surface being convex,
the underside of the lid substantially planar,
a plurality of wall elements depending substantially perpendicularly from the underside of the lid,
the buoyant lid is a hollow polymeric shell,
the guide member is an elongate vertically disposed rod,
the rod spaced apart from a side of the basin,
the lid including an opening therethrough through which the guide member is received,
at least one of the wall elements being longitudinally aligned with the lid,
at least a second of the wall elements being perpendicular to the at least one of the wall elements,
the wall elements integral with the polymeric shell,
the wall elements being hollow,
an upstanding post integrally formed on a bottom of the at least one basin,
a heater element supported upon the upstanding post,
the heater element encircling the upstanding post.

16. Apparatus for watering animals, the invention comprising
a housing supported upon a ground surface, the housing comprising at least one basin for receiving water, the housing supporting the at least one basin elevated above the ground surface, the at least one basin having a top opening through which an animal may access water within the at least one basin, a buoyant lid supported by water within the at least one basin, the lid comprising an upper surface, the upper surface being convex, the lid generally conforming to the top opening of the at least one basin, at least a first guide member mounted to the housing and disposed generally vertically, the guide member extending into the at least one basin spaced apart from a side thereof, the lid including an opening therethrough through which the guide member is received, the lid slidable along the guide member, whereby the lid may be forced downwardly by an animal seeking water in the at least one basin.

17. Apparatus for watering animals, the invention comprising a housing supported upon a ground surface, the housing comprising at least one basin for receiving water, the housing supporting the at least one basin elevated above the ground surface, the at least one basin having a top opening through which an animal may access water within the at least one basin, a buoyant lid supported by water within the at least one basin, an upstanding post integrally formed on a bottom of the at least one basin, the upstanding post disposed generally centrally on said bottom, a heater element supported upon the upstanding post, the heater element imparting heat to the water in the at least one basin, the lid generally conforming to the top opening of the at least one basin, at least a first guide member mounted to the housing and disposed generally vertically, the guide member extending into the at least one basin, the lid slidable along the guide member, whereby the lid may be forced downwardly by an animal seeking water in the at least one basin.

18. Apparatus for watering animals, the invention comprising a housing supported upon a ground surface, the housing comprising at least one basin for receiving water, the housing supporting the at least one basin elevated above the ground surface, the at least one basin having a top opening through which an animal may access water within the at least one basin, a buoyant lid supported by water within the at least one basin, the lid generally conforming to the top opening of the at least one basin, the lid comprising a plurality of wall elements depending substantially perpendicularly from an underside thereof, the lid displaceable by an animal seeking water within the at least one basin, at least one retaining element extending into the at least one basin, the at least one retaining element retaining the lid within the at least one basin.

* * * * *